United States Patent
Yang et al.

(10) Patent No.: US 9,838,906 B2
(45) Date of Patent: Dec. 5, 2017

(54) METHOD FOR PERFORMING MEASUREMENT THROUGH ELIMINATING INTERFERENCE AND TERMINAL

(71) Applicant: LG ELECTRONICS INC., Seoul (KR)

(72) Inventors: Yoonoh Yang, Seoul (KR); Jinyup Hwang, Seoul (KR); Manyoung Jung, Seoul (KR); Sangwook Lee, Seoul (KR); Suhwan Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 14/759,096

(22) PCT Filed: Nov. 29, 2013

(86) PCT No.: PCT/KR2013/010965
§ 371 (c)(1),
(2) Date: Jul. 2, 2015

(87) PCT Pub. No.: WO2014/112716
PCT Pub. Date: Jul. 24, 2014

(65) Prior Publication Data
US 2015/0358855 A1    Dec. 10, 2015

Related U.S. Application Data

(60) Provisional application No. 61/753,946, filed on Jan. 18, 2013.

(51) Int. Cl.
*H04W 28/04*    (2009.01)
*H04L 5/00*    (2006.01)
(Continued)

(52) U.S. Cl.
CPC ........ *H04W 28/048* (2013.01); *H04B 17/345* (2015.01); *H04B 17/382* (2015.01);
(Continued)

(58) Field of Classification Search
USPC ............... 370/251–312, 328–331, 201, 242; 455/418–456
See application file for complete search history.

(56) References Cited

U.S. PATENT DOCUMENTS 8,712,401 B2 *  4/2014  Yoo .................. H04L 5/005
                                                370/242
8,737,187 B2 *  5/2014  Yoo .................. H04J 11/005
                                                370/201
(Continued)

FOREIGN PATENT DOCUMENTS

| JP | 2012-104951 A | 5/2012 |
| WO | 2012-093902 A2 | 7/2012 |

OTHER PUBLICATIONS

Qualcomm Incorporated, "Impact from CRS interference on performance", R1-105591, 3GPP TSG-RAN WG1 #62bis, Oct. 11-15, 2010, Xi'an, China, pp. 1-5.

*Primary Examiner* — Man Phan
(74) *Attorney, Agent, or Firm* — Dentons US LLP

(57) ABSTRACT

The present invention provides a method for performing a measurement by a terminal in a wireless communications system having both a macro cell and a small cell. The method for performing a measurement includes the step of receiving CRS (Cellspecific Reference Signal) support information from the macro cell or the small cell which works as a serving cell. The CRS support information may contain the information of a cell sending a CRS causing interference. The method may include the step of receiving respectively a CRS from the macro and a CRS from the small cell. Here, a timing offset may be adjusted between the sub-frame receiving the CRS from the macro cell and the sub-frame receiving the CRS from the small cell.

10 Claims, 18 Drawing Sheets

(51) Int. Cl.
*H04W 72/04* (2009.01)
*H04W 24/08* (2009.01)
*H04B 17/345* (2015.01)
*H04B 17/382* (2015.01)

(52) U.S. Cl.
CPC ............ *H04L 5/005* (2013.01); *H04L 5/0032* (2013.01); *H04L 5/0073* (2013.01); *H04L 5/0091* (2013.01); *H04W 24/08* (2013.01); *H04W 72/042* (2013.01); *H04L 5/001* (2013.01); *H04L 5/0023* (2013.01)

(56) References Cited

U.S. PATENT DOCUMENTS

| | | | |
|---|---|---|---|
| 9,100,843 B2* | 8/2015 | Yoo | H04W 56/00 |
| 9,161,370 B2* | 10/2015 | Lee | H04W 72/1231 |
| 9,179,349 B2* | 11/2015 | Nagata | H04W 24/10 |
| 9,344,248 B2* | 5/2016 | Krishnamurthy | H04L 5/0053 |
| 9,414,242 B2* | 8/2016 | Kim | H04W 24/02 |
| 9,420,476 B2* | 8/2016 | Koutsimanis | |
| 9,544,794 B2* | 1/2017 | Kim | H04W 36/04 |
| 9,549,331 B2* | 1/2017 | Kim | H04W 36/04 |
| 2011/0256861 A1 | 10/2011 | Yoo et al. | |
| 2012/0122472 A1* | 5/2012 | Krishnamurthy | H04L 5/0053 455/456.1 |
| 2015/0043369 A1* | 2/2015 | Kim | H04J 11/005 370/252 |

* cited by examiner

METHOD FOR PERFORMING MEASUREMENT THROUGH ELIMINATING INTERFERENCE AND TERMINAL

This application is a 35 U.S.C. §371 National Stage Entry of International Application No. PCT/KR2013/010965 filed Nov. 29, 2013, which claims benefit of and priority to U.S. Provisional Application No. 61/753,946 filed Jan. 18, 2013, both of which are incorporated by reference for all purposes as if fully set forth herein.

BACKGROUND OF THE INVENTION

Field of the Invention

A disclosure of the present specification relates to a method and terminal for performing measurements through removing interference.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

In addition, recently, there is ongoing discussion on a heterogeneous network in which a macro cell and a small-scale cell co-exist. In particular, there is an ongoing discussion for traffic offloading by distributing terminals having access to the macro cell to the small-scale cell.

Meanwhile, due to the small-scale cell, interference may be increased more, and according to this, interference cancellation function is desperately needed.

SUMMARY OF THE INVENTION

Accordingly, in an aspect, a disclosure of the present specification proposes a method and terminal which can effectively remove interference.

To achieve the aforementioned aim, one disclosure of the present specification provides a method for performing measurements by a terminal in a wireless communication system in which a macro cell and a small-scale cell coexist. The method may comprise: receiving Cell-specific Reference Signal (CRS) assistance information from any one cell that corresponds to a serving cell among the macro cell and the small-scale cell. The CRS assistance information may include information on a cell that transmits a CRS that causes interference. The method may comprise: receiving each of the CRS from the macro cell and the CRS from the small-scale cell. Here, a timing offset may be adjusted between a subframe in which the CRS is received from the macro cell and a subframe in which the CRS is received from the small-scale cell. The method may comprise: performing a measurement for the CRS from the serving cell by performing the interference cancellation function for the remaining CRS except the CRS from the serving cell using the CRS assistance information.

To achieve the aforementioned aim, one disclosure of the present specification provides a terminal for performing measurements in a wireless communication system in which a macro cell and a small-scale cell coexist. The terminal may comprise: a receiver configured to receive Cell-specific Reference Signal (CRS) assistance information from any one cell that corresponds to a serving cell among the macro cell and the small-scale cell. Here, the receiver receives each of the CRS from the macro cell and the CRS from the small-scale cell. Also, the CRS assistance information includes information on a cell that transmits a CRS that causes interference. A timing offset is adjusted between a subframe in which the CRS is received from the macro cell and a subframe in which the CRS is received from the small-scale cell. The terminal may comprise: a processor configured to perform a measurement for the CRS from the serving cell by performing the interference cancellation function with respect to the remaining CRS except the CRS from the serving cell using the CRS assistance information.

Measurement configuration information may be further received from the serving cell. The measurement configuration information includes information on a subframe in which a measurement of a neighbor cell is to be performed.

The CRS assistance information may be received with being included in radio resource configuration information. The radio resource configuration information includes information on a subframe in which a measurement of the serving cell is to be performed.

The CRS assistance information may include information on the CRS that causes interference and information on a cell that transmits the CRS that causes interference.

The timing offset is identical to or less than 3 us. Or, the timing offset may be identical to or less than cyclic prefix length/2.

ADVANTAGEOUS EFFECTS

According to a disclosure of the present specification, a reception performance can be increased through the interference cancellation function.

DESCRIPTION OF EXEMPLARY EMBODIMENTS

Figure 1:
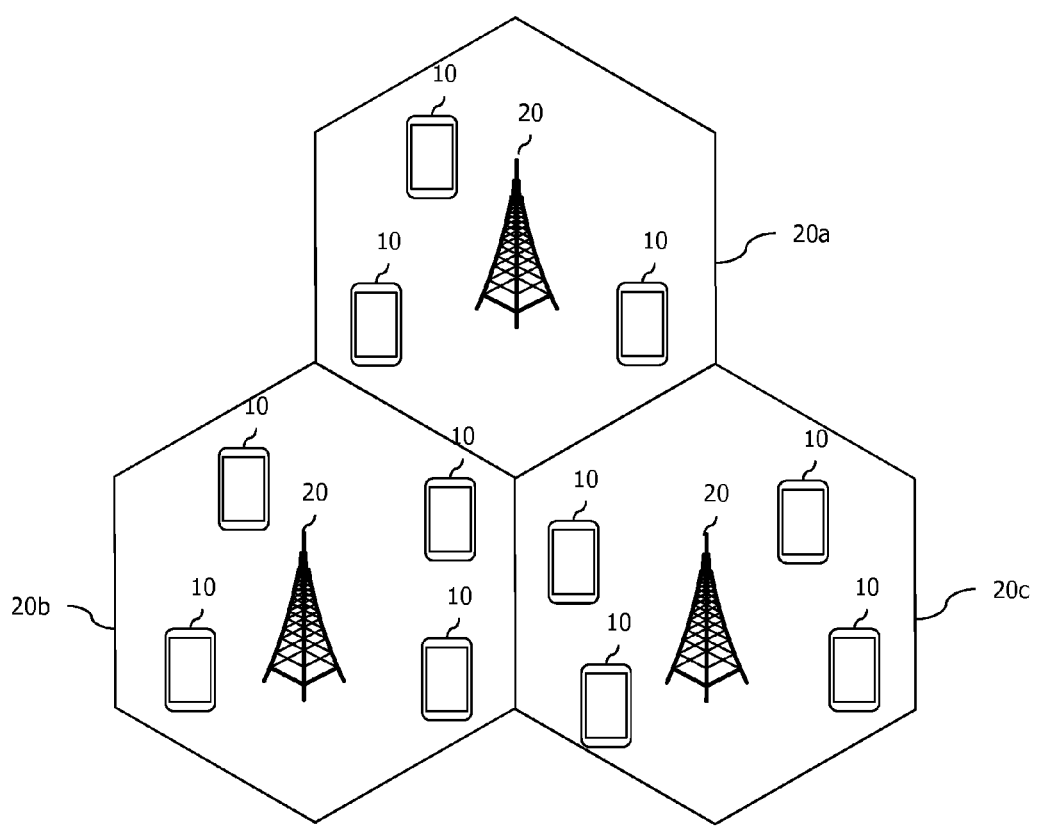
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna.

Hereinafter, the transmit antenna means a physical or logical antenna used to transmit one signal or stream and the receive antenna means a physical or logical antenna used to receive one signal or stream.

Figure 2:
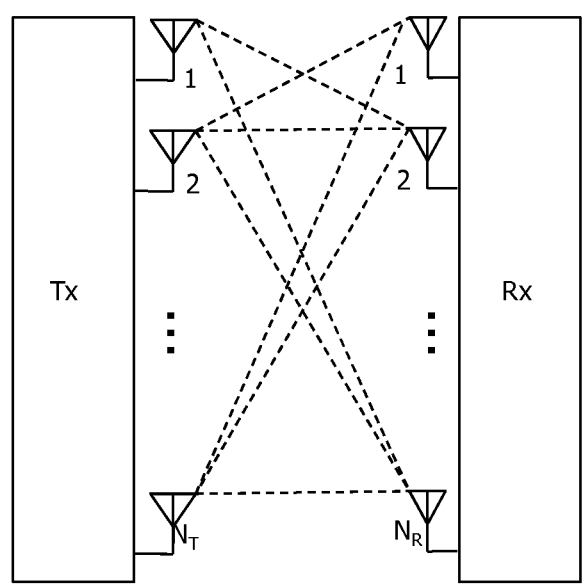
FIG. 2 illustrates a structure of a general multiple antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below. That is, for example, in the MIMO communication system that uses 4 transmission antennas and 4 reception antennas, the transmission rate may be increased 4 times in comparison with the single antenna system theoretically.

After the theoretical increase of capacity in such a multiple antenna system is proved in the middle of 1990', various technologies to induce the theoretical increase into actual increase of data transmission rate has been researched up to now, and a few of the technologies are already applied to various wireless communication standards such as third generation mobile communication and next generation wireless LAN, etc.

$$R_i = \min(N_T, N_R) \quad \text{[Equation 1]}$$

The research trends in relation to the multiple antenna up to now show that researches have been vigorously progressed in various aspects such as a research in the aspect of information theory in relation to communication capacity calculation of multiple antenna in various channel environment and multiple access environment, researches of wireless channel measurement and modeling process of the multiple antenna system, and a research of space-time signal processing for increasing transmission reliability and transmission rate, etc.

In a user equipment structure having general MIMO channel environment, reception signals received in each reception antenna can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 2]}$$

$$Hx + n$$

Herein, the channel between respective transmission and reception antennas may be distinguished based on transmission and reception index, and the channel passing from a transmission antenna j to a reception antenna i is represented as $h_{ij}$. In case of using precoding scheme like LTE when transmitting a signal, the transmission signal x can be expressed by Equation 3.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 3]}$$

$$W\hat{s} = WPs$$

Herein, $w_{ij}$, a precoding matrix w means a weighting between a ith transmission antenna and jth information. In this time, if the transmission power of a respective signal to be transmitted is P1, P2, . . . , PNT, a transmission information of which transmission power has been adjusted may be represented as a diagonal matrix P as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 3:
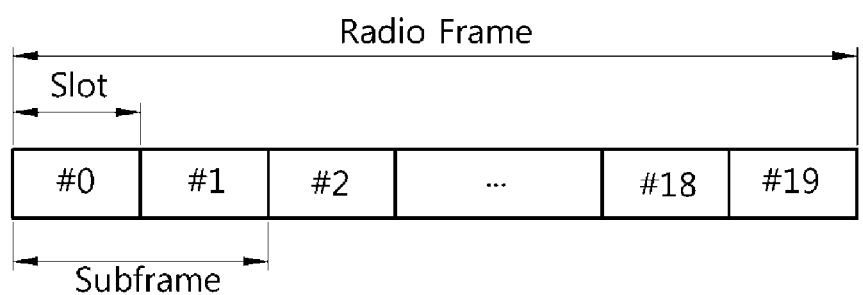
FIG. 3 illustrates the architecture of a radio frame according to FDD in 3GPP LTE.

FIG. 3 illustrates the architecture of a radio frame according to FDD in 3GPP LTE.

Referring to FIG. 3, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 4:
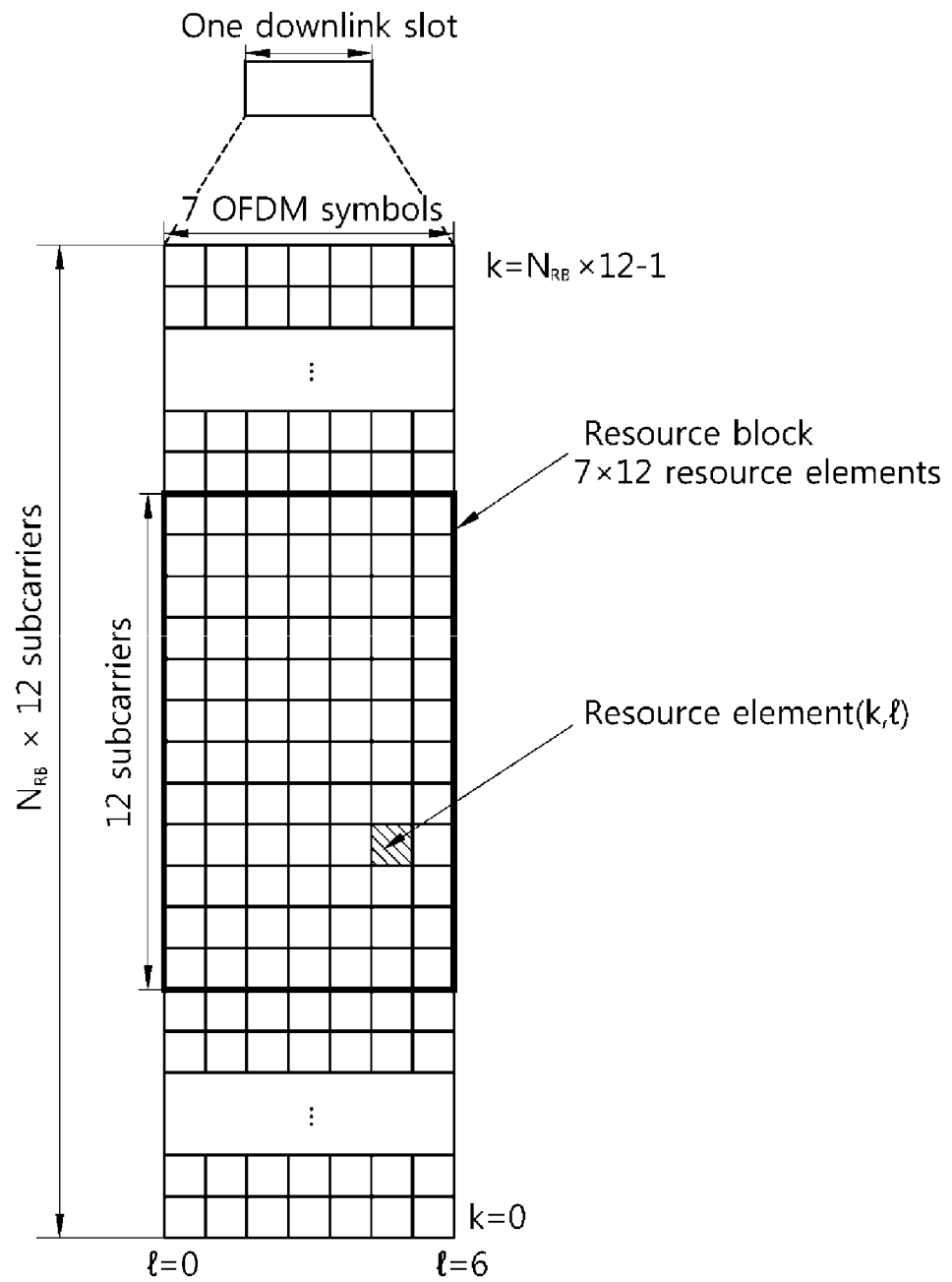
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 5:
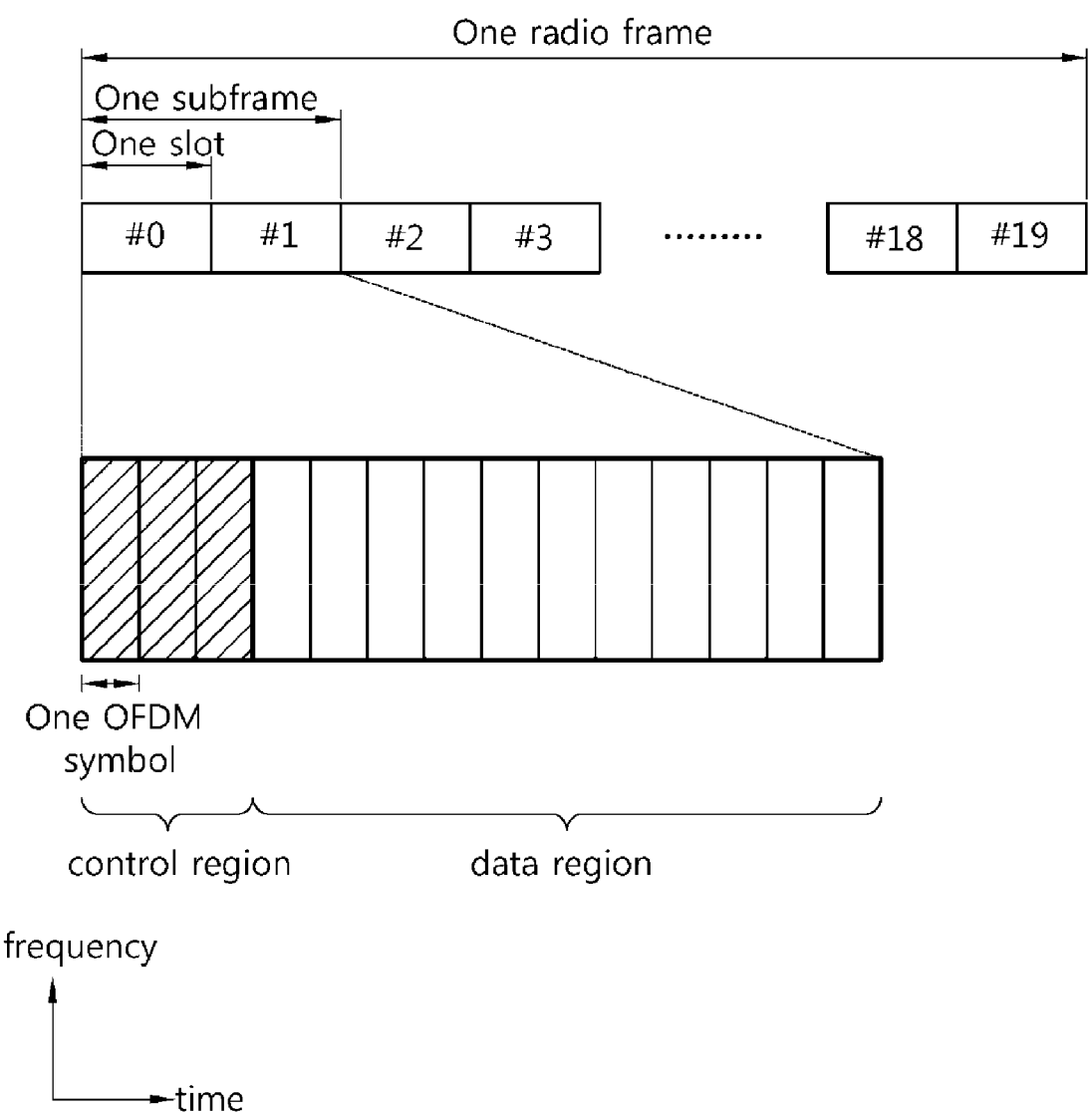
FIG. 5 illustrates the architecture of a downlink subframe.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
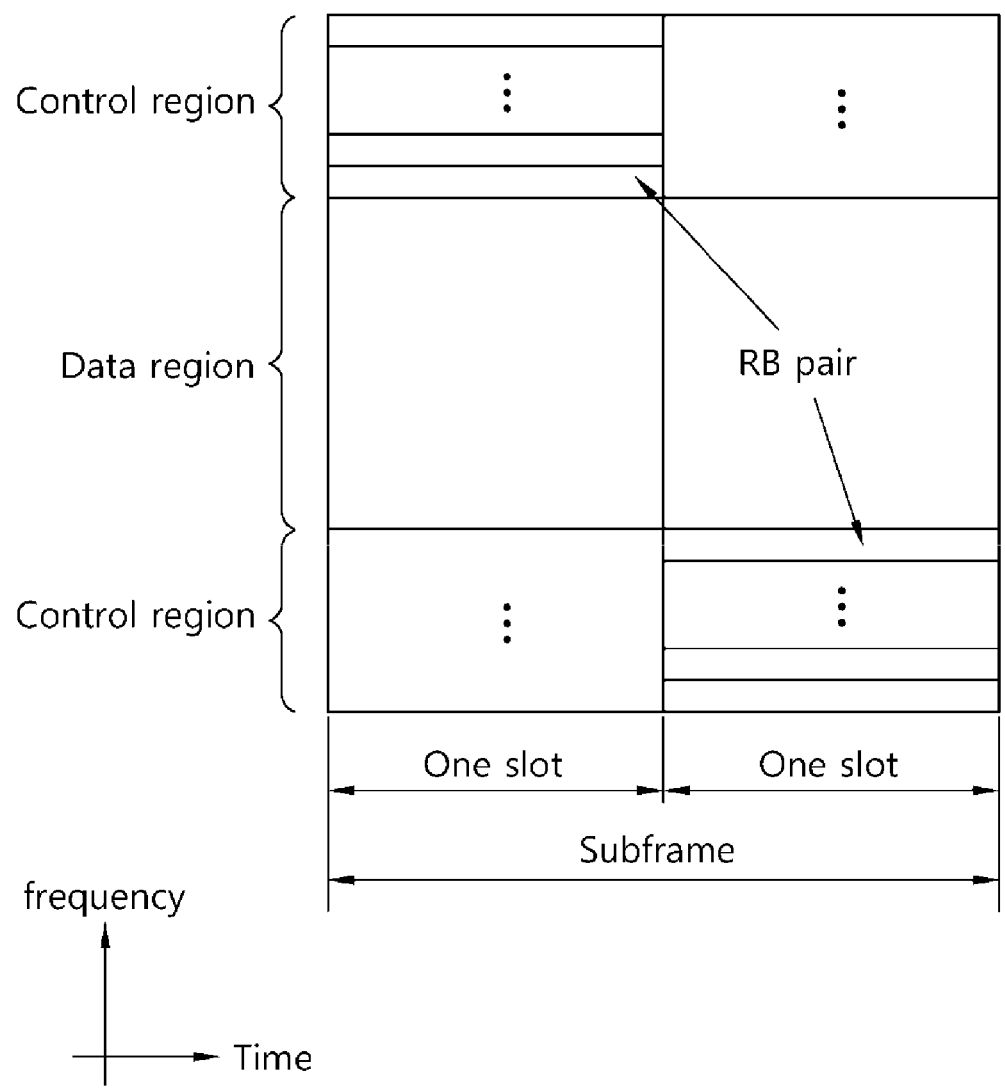
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 7:
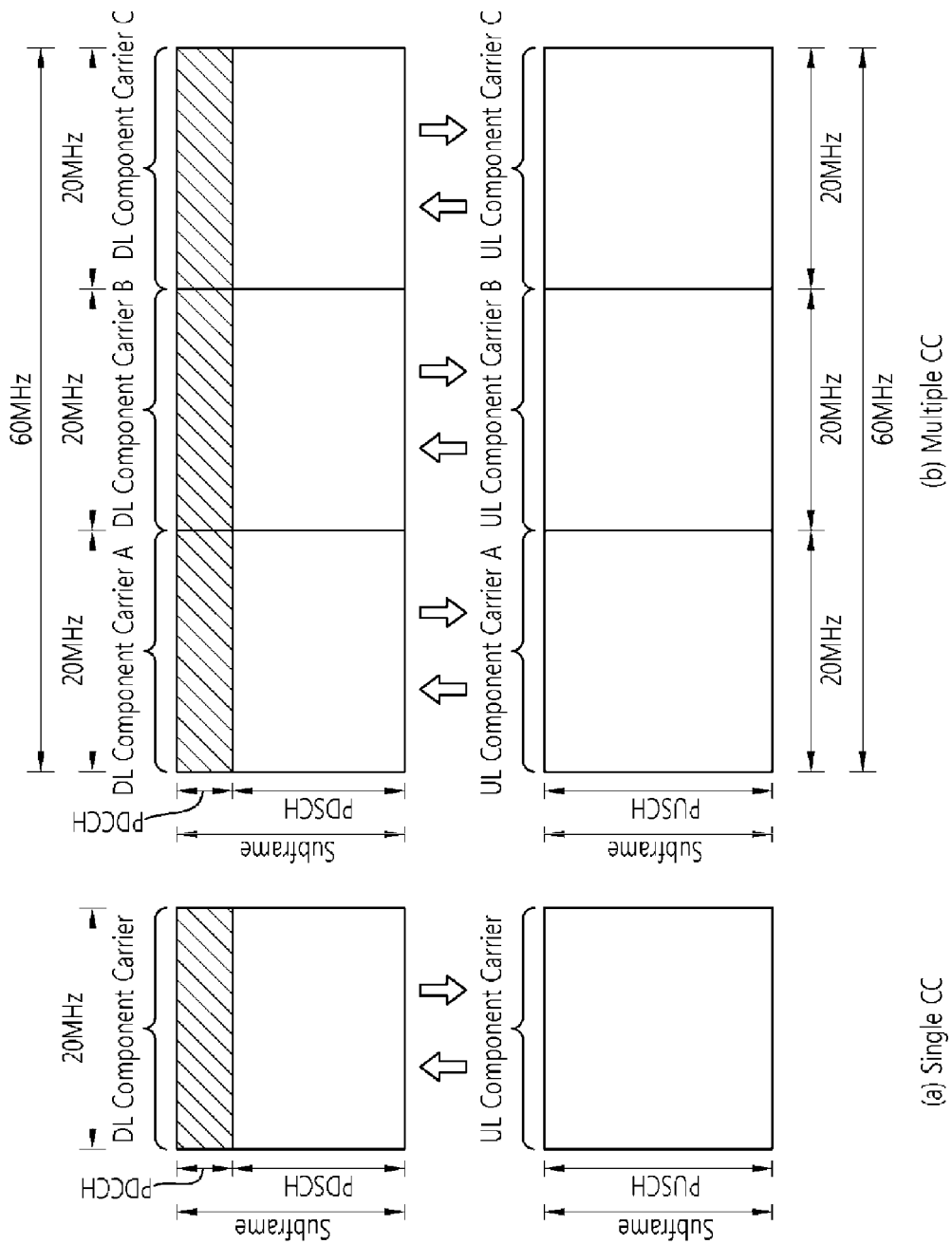
FIG. 7 illustrates a comparative example between the existing single carrier system and a carrier aggregation system.

FIGS. 7a and 7b illustrate an example of comparison between a single carrier system and a carrier aggregation system.

Referring to FIG. 7a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 7a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 7b may correspond to a communication example in an LTE-A system.

Referring to FIG. 7b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 7b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 7b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Figure 8:
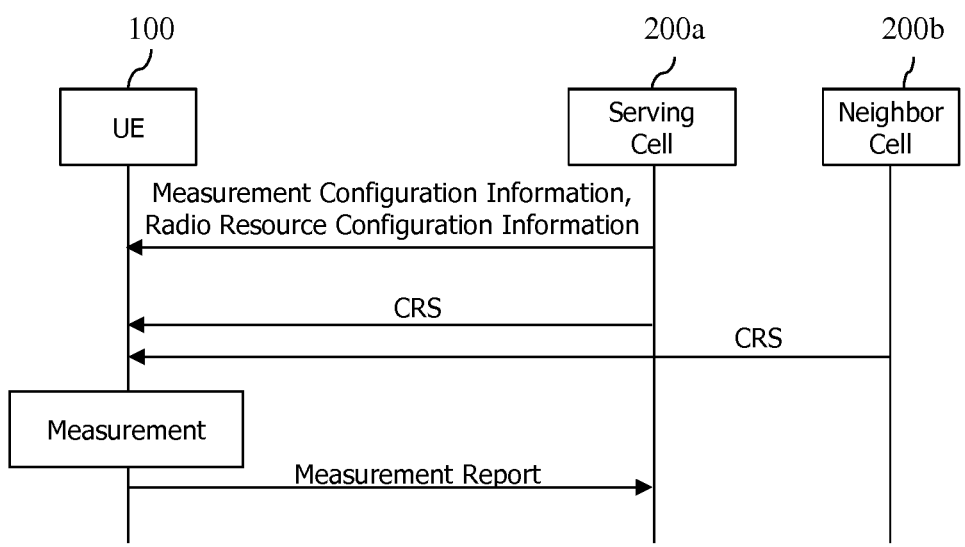
FIG. 8 illustrates a measurement and a measurement report.

FIG. 8 shows measurement and measurement reporting procedures.

It is necessary for a mobile communication system to support a mobility of a UE 100. Therefore, the UE 100 persistently measures quality for a serving cell which currently provides a service and quality for a neighbour cell. The UE 100 reports a measurement result to a network at a proper time, and the network provides an optimal mobility to the UE through a handover or the like. A measurement performed for such a purpose is ordinarily called a radio resource management (RRM).

Meanwhile, the UE 100 monitors downlink quality of a primary cell (Pcell) on the basis of a CRS. This is called radio link monitoring (RLM). For the RLM, the UE 100 estimates the downlink quality, and compares it with thresholds (e.g., Qout and Qin) of the estimated downlink quality. The threshold Qout is defined as a level at which a downlink cannot be received reliably, and this corresponds to a 10% error of a PDCCH transmission by considering a PCFICH error. The threshold Qin is defined as a level at which the downlink is significantly reliable in comparison with Qout, and this corresponds to a 2% error of the PDCCH transmission by considering the PCFICH error.

As can be seen with reference to FIG. 8, if each of a serving cell 200a and a neighbour cell 200b transmits a cell-specific reference signal (CRS) to the UE 100, the UE 100 performs a measurement through the CRS, and transmits an RRC measurement report message including a measurement result thereof to the serving cell 200a.

In this case, the UE 100 may perform the measurement by using three methods described below.

1) Reference signal received power (RSRP): It indicates average reception power of all REs which carry a CRS transmitted through the entire band. In this case, average reception power of all REs which carry a CSI RS may be measured instead of the CRS.

2) Received signal strength indicator (RSSI): It indicates reception power measured in the entire band. The RSSI includes all of a signal, an interference, and a thermal noise.

3) Reference symbol received quality (RSRQ): It indicates a CQI, and may be determined as a different RSRP/RSSI according to a measurement bandwidth or subband. That is, the RSRQ implies a signal-to-noise interference ratio (SINR). Since the RSRP cannot provide sufficient mobility information, the RSRQ may be used in a handover and a cell reselection instead of the RSRP.

It may be calculated as RSRQ=RSSI/RSSP.

Meanwhile, the UE 100 receives a measurement configuration information element (IE) from the serving cell 200a for the measurement. A message including the measurement configuration IE is called a measurement configuration message. Herein, the measurement configuration IE may also be received through an RRC connection reconfiguration message. When the measurement result satisfies a report condition in measurement configuration information, the UE reports a measurement result to a BS. The message including the measurement result is called a measurement report message.

The measurement configuration IE may include measurement object information. The measurement object information is information regarding an object for which a measurement is performed by the UE. The measurement object includes at least one of an intra-frequency measurement object which is an object of an intra-frequency measurement, an inter-frequency measurement object which is an object of an inter-frequency measurement, and an inter-RAT measurement object which is an object of an inter-RAT measurement. For example, the intra-frequency measurement object may indicate a neighbour cell having the same frequency band as a frequency band of a serving cell, the inter-frequency measurement object may indicate a neighbour cell having a frequency band different from a frequency band of the serving cell, and the inter-RAT measurement object may indicate a neighbour cell having an RAT different from an RAT of the serving cell.

Specifically, the measurement configuration IE includes IEs shown in the following table.

TABLE 1

MeasConfig ::=
-- Measurement objects
    measObjectToRemoveList
    measObjectToAddModList The measurement objects IE includes measObjectToRemoveList which indicates a list of measObject to be removed and measObjectToAddModList which indicates a list to be newly added or to be modified.

The measObject includes MeasObjectCDMA2000, MeasObjectEUTRA, MeasObjectGERAN, etc., according to a communication technique.

Meanwhile, the MeasObjectEUTRA IE includes information applied for an intra-frequency or an inter-frequency as to a measurement of an E-UTRA cell. The MeasObjectEUTRA IE is expressed by the following table.

TABLE 2

1) MeasObjectEUTRA
- neighCellConfig
  measSubframePatternConfigNeigh-r10
2) MeasSubframePatternConfigNeigh-r10
    measSubframePatternNeigh-r10
    measSubframeCellList-r10

The MeasObjectEUTRA IE is expressed more specifically by the following table.

TABLE 3

Description on MeasObjectEUTRA field carrierFreq
To identify an E-UTRA carrier frequency at which this configuration is valid.
neighCellConfig
To indicate configuration information of a neighbour cell.
measCycleSCell
Parameter: Tmeasure_scc
This parameter is used when a secondary cell (SCell) operates on a frequency indicated by measObject and is in an inactive state.
measSubframeCellList
This is a list of cells to which measSubframePatternNeigh is applied. If not included, a UE assumes that a time domain measurement resource restriction pattern is applied to all neighbour cells.
measSubframePatternNeigh
This is a time domain measurement resource restriction pattern used when an RSRP and an RSRQ are measured for a neighbour cell on a carrier frequency indicated by the carrierFreq.

As described above, the MeasObjectEUTRA IE includes configuration information of a neighbour cell (i.e., NeighCellConfig) and a time domain measurement resource restriction pattern (i.e., measSubframePatternNeigh) used to measure an RSRP and an RSRQ for the neighbour cell and a cell list (i.e., measSubframeCellList) to which the pattern is applied.

Meanwhile, the UE 100 also receives a radio resource configuration IE as illustrated.

The radio resource configuration dedicated IE is used to configure/modify/release a radio bearer or is used to modify a MAC configuration. The radio resource configuration dedicated IE includes subframe pattern information. The subframe pattern information is information regarding a measurement resource restriction pattern on a time domain for measuring an RSRP and an RSRQ as to a primary cell (PCell).

The radio resource configuration IE includes fields shown in the following table.

TABLE 4

RadioResourceConfigDedicated
measSubframePatternPCell-r10

The RadioResourceConfigDedicated field includes the following parameters.

TABLE 5

Description on radioResourceConfigDedicated field logicalChannelConfig
It is used to select whether a logical channel configuration is explicitly signaled for SRBs or a default logical channel configuration is configured for an SRB1.
logicalChannelIdentity
A logical channel identifier for identifying both of an uplink (UL) and a downlink (DL).
mac-MainConfig
This is an option used to indicate whether mac-MainConfig is explicitly signaled or a default MAC main configuration is configured.
measSubframePatternPCell
A time domain measurement resource restriction pattern for performing a measurement (RSRP, RSRQ) as to a primary cell (PCell, i.e., a first cell) (or a serving cell).

As described above, the RadioResourceConfigDedicated field includes measSubframePatternPCell or measSubframePattern-Serv which indicates a time domain measurement resource restriction pattern for performing a measurement (RSRP, RSRQ) as to the primary cell (PCell, i.e., a first cell) (or a serving cell).

Figure 9:
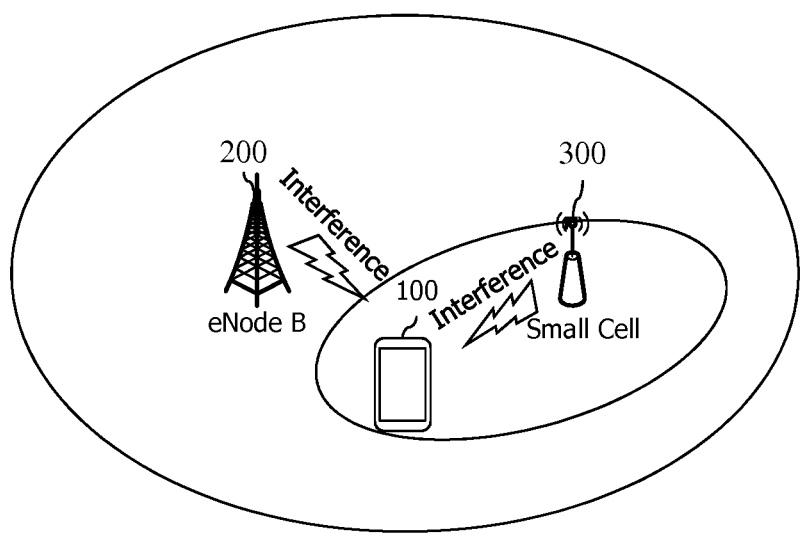
FIG. 9 illustrates a hetero-network that includes a macro cell and a small-scale cell.

FIG. 9 illustrates a heterogeneous network including a macro cell and a small-scale cell.

A heterogeneous network in which a small-scale cell (e.g., a pico cell, a femto cell, or a micro cell) having lower-power transmit power exists in the existing macro cell coverage in an overlapping manner is under discussion in a next-generation communication standard including 3GPP LTE-A.

Referring to FIG. 9, the macro cell may overlap with one or more micro cells. A service of the macro cell is provided by a macro eNodeB (MeNB). In the present application, the macro cell and the MeNB may be used together. A UE having access to the macro cell may be referred to as a macro UE. The macro UE receives a downlink signal from the MeNB, and transmits an uplink signal to the MeNB.

The aforementioned small-scale cell is also referred to as a femto cell, a pico cell, or a macro cell. A service of the small-scale cell is provided by a pico eNodeB, a home eNodeB (HeNB), a relay node (RN), etc. For convenience, the pico eNodeB, the HeNB, and the RN are collectively referred to as the HeNB. In the present application, the macro cell and the HeNB may be used together.

The small-scale cell may be divided into an OA (open access) cell and a CSG (closed subscriber group) cell according to an accessibility. The OA cell implies a cell in which the UE can receive a service anytime when necessary without an additional access restriction. On the other hand, the CSG cell implies a cell in which only an authorized specific UE can receive a service.

The heterogeneous network has an inter-cell interference problem since the macro cell and the small-scale cell overlap. As illustrated, if the UE is located in a boundary of the macro cell and the small-scale cell, a downlink signal from the macro cell may act as an interference. Similarly, a downlink signal of the small-scale cell may also act as an interference.

For a more specific example, when the UE 100 connected to the small-scale cell 300 is located in a boundary of the small-scale cell, the connection with the small-scale cell 300 may be disconnected due to an interference from the macro cell 200. This implies that a coverage of the small-scale cell 300 is smaller than expected.

For another example, if the UE 100 connected to the macro cell 200 is located in an area of the small-scale cell 300, the connection with the macro cell 200 may be disconnected due to an interference from the small-scale cell 300. This implies that a shadow area exists in the macro cell 200.

In the most fundamental method for solving such an interference problem, different frequencies are used between cells. However, since a frequency is a rare and expensive resource, a method of solving the problem by using a frequency division is not much welcomed by a vendor.

Accordingly, in 3GPP, such an inter-cell interference problem is to be solved through a time division manner.

According to this, recently, as one of interference corporation methods, vigorous researches for enhanced inter-cell interference coordination (eICIC) have been progressed.

The time division method introduced in LTE release-10 is called an enhanced ICIC (inter-cell interference coordination) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an ABS (almost blank subframe). No data is transmitted other than essential control information in a subframe corresponding to the ABS. For example, the essential control information is a CRS (cell-specific reference signal). In the current 3GPP LTE/LTE-A standard, the CRS signal exists only in OFDM symbols #0, #4, #7, and #11 in each subframe on a time axis. Accordingly, in the subframe to which the ABS is applied, only the CRS signal is transmitted on the OFDM symbols #0, #4, #7, and #11.

Figure 10:
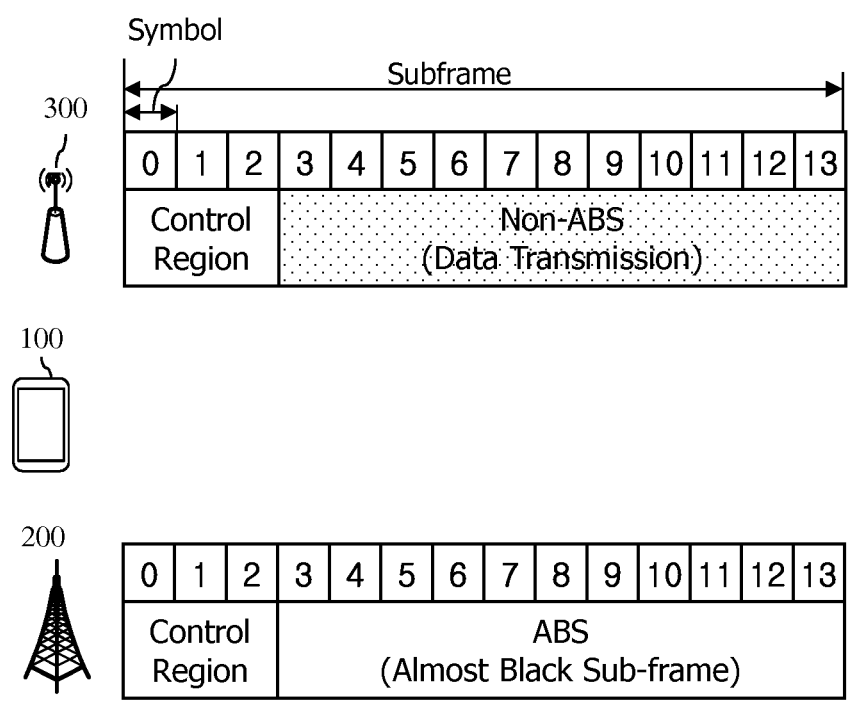
FIG. 10 illustrates enhanced inter-cell interference coordination (eICIC) for solving inter-base station interference.

FIG. 10 illustrates an example of an eICIC (enhanced inter-cell interference coordination) for solving an interference between BSs.

Referring to FIG. 10, the small-scale cell 300 corresponding to the aforementioned pico cell performs data transmission in a data region of the subframe.

At the moment, the macro cell, that is, the eNodeB 200 applies the eICIC in order to solve the interference. That is, if the eICIC is applied, the corresponding subframe is operated according to the ABS, and thereby, no data may be transmitted in the data region.

As described above, in addition to solving an inter-cell interference problem by using the eICIC scheme, there may be a method of adding an interference cancellation function to the UE 100. Hereinafter, the method of adding the interference cancellation function is described.

Figure 11:
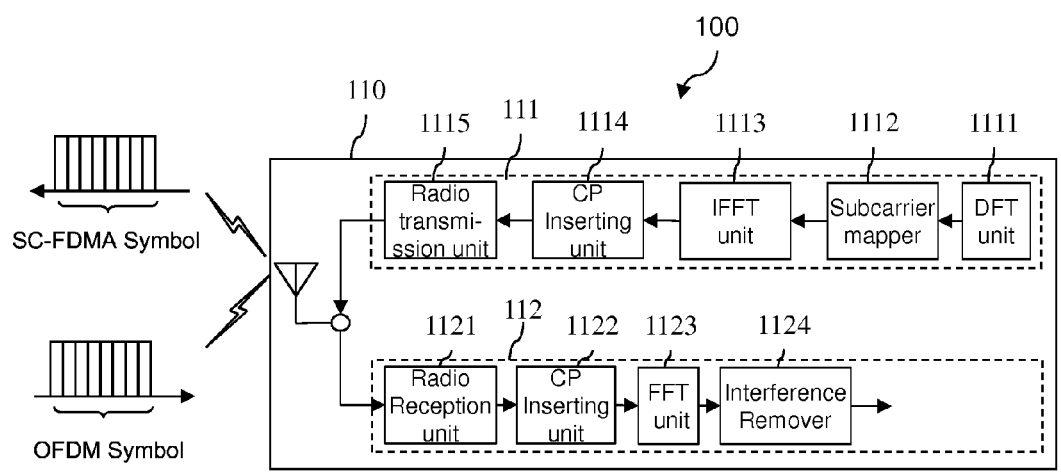
FIG. 11 is a block diagram illustrating a structure of a UE according to an aspect of the present specification.

FIG. 11 is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 11, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, and an interference cancellation unit 1124. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1124 cancels or relieves interference included in a received signal.

The receiver 112 in which the interference cancellation unit 1124 is added, co-called an interference cancellation (IC) receiver or an Interference Rejection Combiner (IRC) receiver may be implemented by deducting interference signal from reception signals, conceptually.

At the moment, the complexity of the receiver in which the interference cancellation unit 1124 is added is dependent upon the maximum number of cells which are objects of interference cancellation and the sort of signals which will be canceled.

The signals which are objects of interference cancellation includes a Cell-specific Reference Signal (CRS), a Physical Broadcasting Channel (PBCH), a Sync Channel (SCH), a Physical downlink shared channel (PDSCH), and the like.

The receiver 112 in which the interference cancellation unit 1124 is added, co-called the IC receiver or the IRC receiver may cope with wireless data requirements which are explosively increased. Particularly, since the increase in reception performance is obtainable without significant increase of complexity, significant performance gain is obtainable in the environment in which interference from neighboring base station is dominant.

Figure 12:
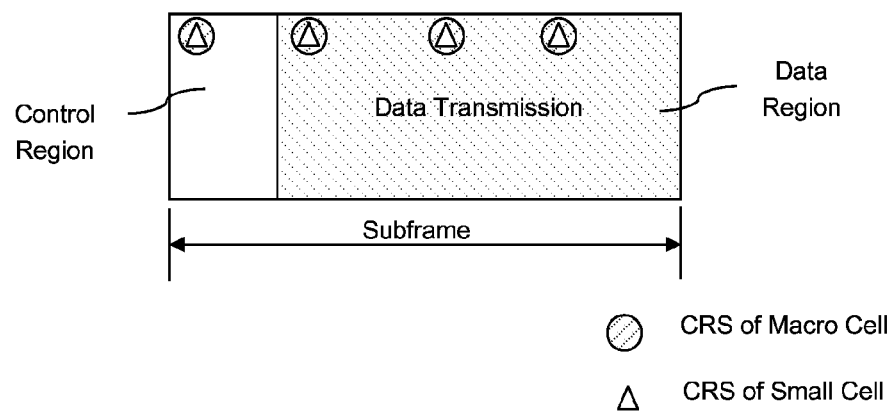
FIG. 12 illustrates interference between reference signals.

FIG. 12 represents interference between reference signals.

Referring to FIG. 12, a CRS of the macro cell 200 and a CRS of the small-scale cell 300 interfere with each other.

In order to solve the interference, even though operating the corresponding subframe as the ABS by applying eICIC, no data will be transmitted in a data region of the corresponding subframe. However, since the CRS is transmitted on the 0, 4, 7 and 11$^{th}$ symbols of the corresponding subframe, there is interference between the CRSs.

Accordingly, in order for the UE 100 to adequately receive the CRS of the macro cell 200 or the small-scale cell 300, the CRS interference cancellation function of the interference cancellation unit 1124 should be operated.

However, in order for the UE 100 to operate the CRS interference cancellation function, the UE 100 should know the information on the CRS of an aggressor cell that causes interference. For this, a serving cell may forward the CRS support data to the UE 100. This will be described with reference to FIG. 13.

FIG. 13 illustrates an example of receiving reference signal through an interference cancellation according to a disclosure of the present specification.

while, in case that the radio access performance of the UE 100 is changed, the higher layer of the UE 100 may instruct to request the capability inquiry to the higher layer of the small-scale cell 300.

And the small-scale cell 300 that corresponds to the serving cell verifies whether the neighbor cell is an aggressor cell that causes interference through information exchange with the macro cell 200 that corresponds to the neighbor cell.

Subsequently, the small-scale cell 300 that corresponds to the serving cell forwards the measurement configuration IE represented in Table 1 and the radio resource configuration IE represented in Table 4 to the UE 100. At the moment, the small-scale cell 300 that corresponds to the serving cell may further forward neighbor cell CRS information (neigh Cells CRS Info) represented in Table 6 below in addition to the RadioResourceConfigDedicated field represented in Table 5, if the UE 100 has the CRS interference cancellation (IC) capability. The neighbor cell CRS information (neigh Cells CRS Info) may include CRS assistance information (CRS Assistance Info) as represented in Table 6 below. The CRS assistance information (CRS Assistance Info) may include a list for the aggressor cell, that is, physCellId that indicates a cell ID of a cell that transmits a CRS that collides with a CRS of a cell that is to perform a measurement, and the CRS information of the aggressor cell.

TABLE 6

| | Description of a RadioResourceConfigDedicated field |
|---|---|
| neighCellsCRSInfo | Including the resource information that can mitigate the interference owing to the CRS, when a UE performs RRM/RLM/CSI measurement or data decoding. The UE deliver the received CRS assistance information to a lower layer.<br>In case that the received CRS assistance information includes information on a cell that transmits the CRS that collides with the CRS that is to perform a measurement, the UE may use the received CRS assistance information in order to mitigate the CRS interference on the subframe that is indicated by measSubframePatternPCell, measSubframePatternConfigNeigh and csi-MeasSubframeSet1.<br>CRS Assistance Info |
| physCellId | A cell ID of a cell that transmits the CRS that collides with the CRS that is to perform the measurement. |
| antennaPortsCount | Antenna port information |

Figure 13A:
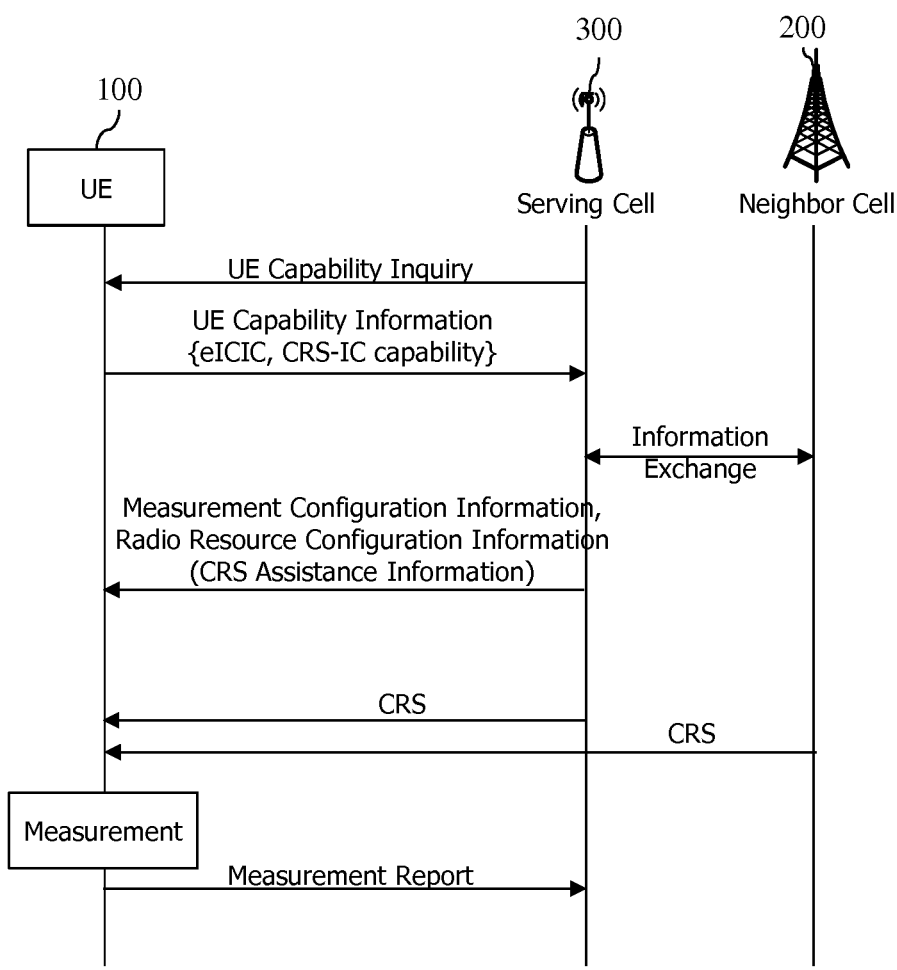
FIGS. 13A and 13B illustrate an example of receiving reference signals through an interference cancellation according to a disclosure of the present specification.
Figure 13B:
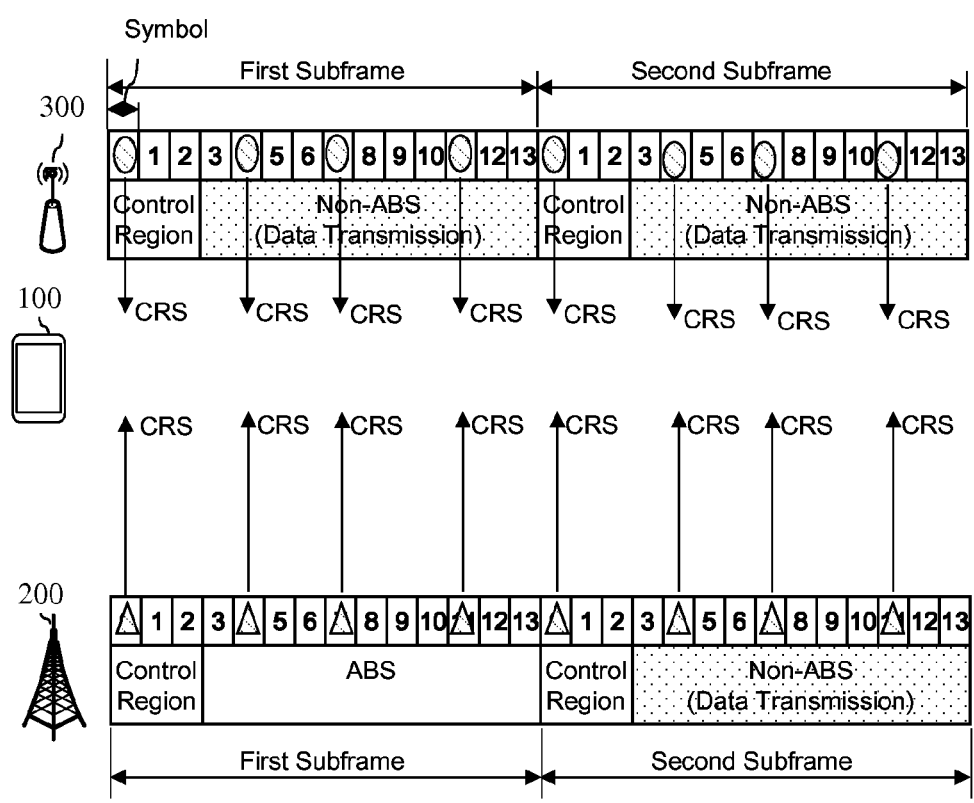

Referring to FIG. 13(a), a situation in which the small-scale cell 300 is a serving cell and the macro cell is a neighbor cell is depicted. At the moment, referring to FIG. 13(b), a first subframe is operated as a normal subframe, not the ABS subframe, by the small-scale cell 300 that corresponds to the serving cell, but is operated as the ABS subframe by the macro cell 200 that corresponds to the neighbor cell. On the other hand, a second subframe is operated as a normal subframe, not the ABS subframe, by the small-scale cell 300 that corresponds to the serving cell, and is also operated as a normal subframe, not the ABS subframe, by the macro cell 200 that corresponds to the neighbor cell.

Referring to FIG. 13(a) again, the small-scale cell 300 that corresponds to the serving cell request a UE capability inquiry to the UE 100 following an instruction from a higher layer as occasion demands.

Then, the UE 100 provides the UE capability information according to the request. That is, in response to the UE capability inquiry, the UE 100 notifies that it has the eICIC capability and the CRS interference cancellation (IC) capability to the small-scale cell 300 that corresponds to the serving cell through the UE capability information. Mean- Then, the UE 100 verifies the received information. At the moment, as a result of verifying the received radio resource configuration IE, according to the measSubframePatternPCell, it is assumed that a subframe which is designated for the measurement of a serving cell is a first subframe, and according to the measSubframePatternConfigNeigh, a subframe which is designated for the measurement of a neighbor cell is a second subframe.

As such, in case that the measSubframePatternPCell is setup for the measurement of the serving cell and the eICIC capability of the corresponding UE 100 is setup, the UE 100 may increase the RSRP and RSRQ performance using the CRS assistance information (i.e., including the ID of aggressor cells and the CRS information).

That is, when performing the measurement of the small-scale cell 300 that corresponds to the serving cell on a first subframe which is designated by the measSubframePatternPCell, the UE 100 may evaluate the RSRQ and the RSRQ with high performance by applying the interference cancellation (IC) for the CRS from the aggressor cell by using the CRS assistance information (i.e., including the ID of aggressor cells and the CRS information).

Meanwhile, in case of obtaining the RSRP for the macro cell 200 that corresponds to the neighbor cell on a second subframe which is designated by the measSubframePattern-ConfigNeigh, the UE 100 may obtain the RSRP for the macro cell 200 after the UE 100 removes the CRS of a neighbor cell which is different from the CRS of the small-scale cell 300 that corresponds to the serving cell.

Figure 14:
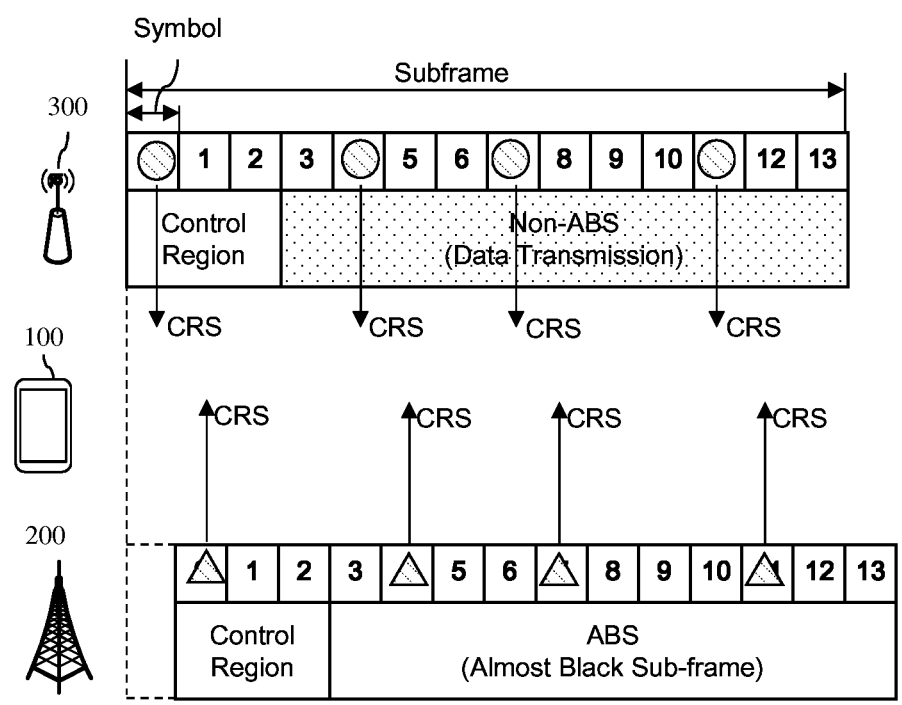
FIG. 14 illustrates a problem that interference is properly removed even though operating the interference cancellation function in case that reference signals are not synchronized.

FIG. 14 illustrates a problem that interference is properly removed even though operating the interference cancellation function in case that reference signals are not synchronized.

As we can know by referring to FIG. 14, even though the UE 100 operates the interference cancellation function, in case that times of the subframe of the small-scale cell 300 and the subframe of the macro cell 200 are not synchronized, a problem that interference is not removed may occur.

Figure 15:
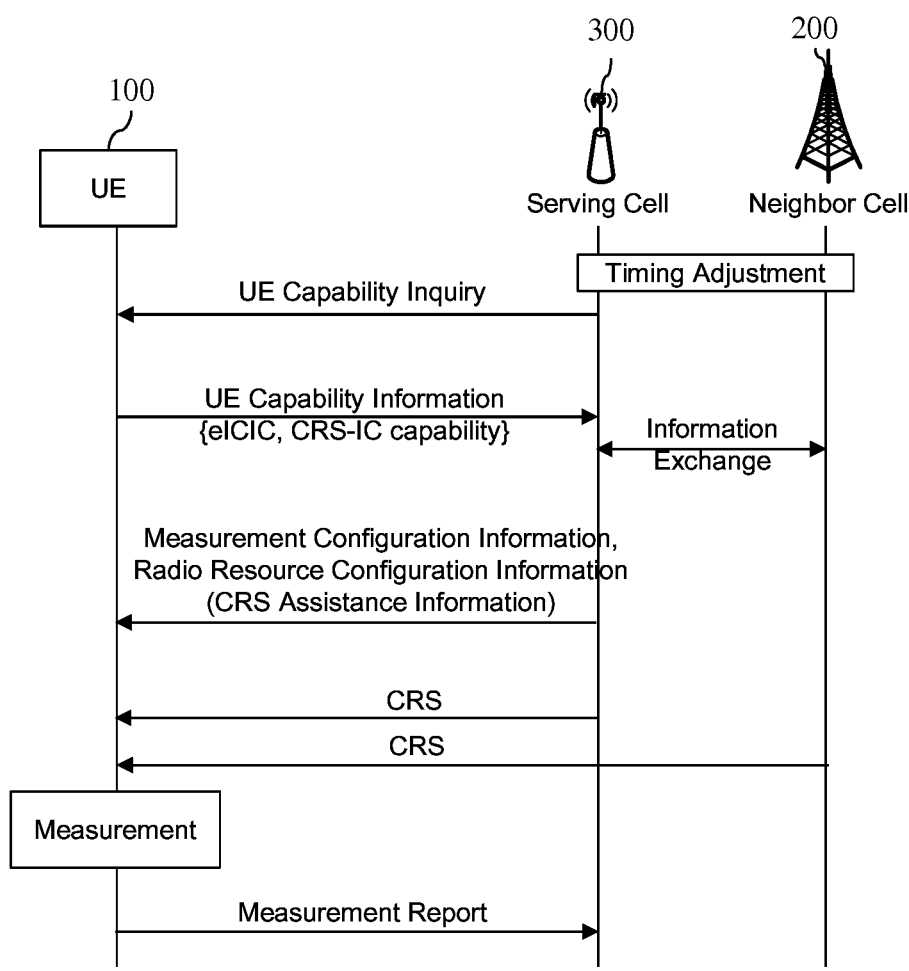
FIG. 15 illustrates an example of receiving a reference signal through the interference cancellation according to another disclosure of the present specification.

Accordingly, as shown in FIG. 15, a timing adjustment is required between the serving cell and the neighbor cell.

FIG. 15 illustrates an example of receiving a reference signal through the interference cancellation according to another disclosure of the present specification.

As we can know by referring to FIG. 15, the serving cell 300 and the neighbor cell 200 adjust timing such that an offset of subframe boundary is within 3 us, thereby guaranteeing the CRS interference cancellation performance of the UE.

Then, the UE 100 that has a capability of interference cancellation should satisfy the following requirements when the UE 100 receives the CRS assistance information and the CRS assistance information is valid. The first requirement is for the FDD and the second requirement is for the TDD.

1. Requirement for the FDD

In case that the discontinuous reception (DRX) is not used, the UE should detect a new FDD intra-frequency cell within the following time.

$$T_{identify\_intra\_FeICIC} = T_{basic\_identify\_E-UTRA\_FDD\_FeICIC, intra} \cdot \frac{T_{Measurement\_Period\_FeICIC, Intra}}{T_{Intra}} \text{ ms} \quad \text{[Equation 5]}$$

Here, $T_{basic\_identify\_E-UTRA\_FDD\_FeICIC, intra}$ is [1000] ms. $T_{intra}$ is a minimum time when the intra-frequency measurement is available during the measurement interval that has an arbitrary selected timing. This time is assumed to be available when a receiver is guaranteed to activate an intra-frequency carrier.

The identification of cells includes performing the measurement during the time interval which is indicated by $T_{Measurement\_Period\_FeICIC, Intra}$ as well as the detection of cells.

Meanwhile, in an RRC connection mode state, the measurement interval for the intra-frequency measurement may be [200] ms. In case that a measurement gap is not activated, a UE should be able to measure the RSRP and the RSRQ for eight intra-frequency cells. The cells may include cells that are not measured in the subframe which is indicated by the time domain measurement resource limitation pattern. In addition, the physical layer of the UE should be able to report the measurement result to a higher layer during the measurement interval, 200 ms. In case that the measurement gap is activated, the UE should be able to perform a measurement for at least $Y_{measurement\_intra\_FeICIC}$ cells. Here, $Y_{measurement\_intra\_FeICIC}$ is defined by the Equation below. Even though the UE identifies cells more than the cells defined in $Y_{measurement\_intra\_FeICIC}$, the UE performs the measurement only for at least eight intra-frequency cells which are identified and reports the result, thereby decreasing report frequency.

$$Y_{measurement\_intra\_FeICIC} = \text{Floor}\left\{X_{basic\_measurement\_FDD\_FeICIC} \cdot \frac{T_{Intra}}{T_{Measurement\_Period\_FeICIC, Intra}}\right\} \quad \text{[Equation 6]}$$

Here, $X_{basic\_measurement\_FDD\_FeICIC}$ is eight cells and $T_{Measurement\_Period\_FeICIC, Intra}$ is 200 ms.

2. Requirement for the TDD

In case that the discontinuous reception (DRX) is not used, the UE should detect a new TDD intra-frequency cell within the following time.

$$T_{identify\_intra\_FeICIC} = T_{basic\_identify\_E-UTRA\_TDD\_FeICIC, intra} \cdot \frac{T_{Measurement\_Period\_FeICIC, Intra}}{T_{Intra}} \text{ ms} \quad \text{[Equation 7]}$$

Here, $T_{basic\_identify\_E-UTRA\_TDD\_eICIC, intra}$ is 1000 ms. $T_{Intra}$ is a minimum time when the intra-frequency measurement is available during the measurement interval that has an arbitrary selected time. This time is assumed to be available when a receiver is guaranteed to activate an intra-frequency carrier.

The identification of cells includes performing the measurement during the time interval which is indicated by $T_{Measurement\_Period\_FeICIC, Intra}$ as well as the detection of cells.

Meanwhile, in an RRC connection mode state, the measurement interval for the intra-frequency measurement may be [200] ms. In case that a measurement gap is not activated, a UE should be able to measure the RSRP and the RSRQ for eight intra-frequency cells. The cells may include cells that are not measured in the subframe which is indicated by the time domain measurement resource limitation pattern. In addition, the physical layer of the UE should be able to report the measurement result to a higher layer during the measurement interval, 200 ms. In case that the measurement gap is activated, the UE should be able to perform a measurement for at least $Y_{measurement\_intra\_FeICIC}$ cells. Here, $Y_{measurement\_intra\_FeICIC}$ is defined by the Equation below. Even though the UE identifies cells more than the cells defined in $Y_{measurement\_intra\_FeICIC}$, the UE performs the measurement only for at least eight intra-frequency cells which are identified and reports the result, thereby decreasing report frequency.

$$Y_{measurement\_intra\_FeICIC} = \text{Floor}\left\{X_{basic\_measurement\_TDD\_FeICIC} \cdot \frac{T_{Intra}}{T_{Measurement\_Period\_FeICIC, Intra}}\right\} \quad \text{[Equation 8]}$$

Here, $X_{basic\_measurement\_FDD\_FeICIC}$ is eight cells and $T_{Measurement\_Period\_FeICIC, Intra}$ is 200 ms.

In addition to the method above, the following method is proposed.

The description described so far is summarized as follows.

A time offset of a subframe boundary between the serving cell and the neighbor cell which is given by the CRS assistance information should be 3 us or less. Alternately, the time offset may be cyclic prefix (CP) length/2 or less.

Alternately, the time offset should be same or less than the cell phase synchronization requirements between a small-scale cell and a wide area cell.

So far, it has been described that the serving cell is a small-scale cell and the neighbor cell is a macro cell, however, the description may also be applied to the case that the serving cell is a macro cell and the neighbor cell is a small-scale cell.

Meanwhile, by using the CRS interference cancellation function using the CRS assistance information, the coverage of a small-scale cell may be expanded. In particular, this will be described with reference to FIG. 16

Figure 16:
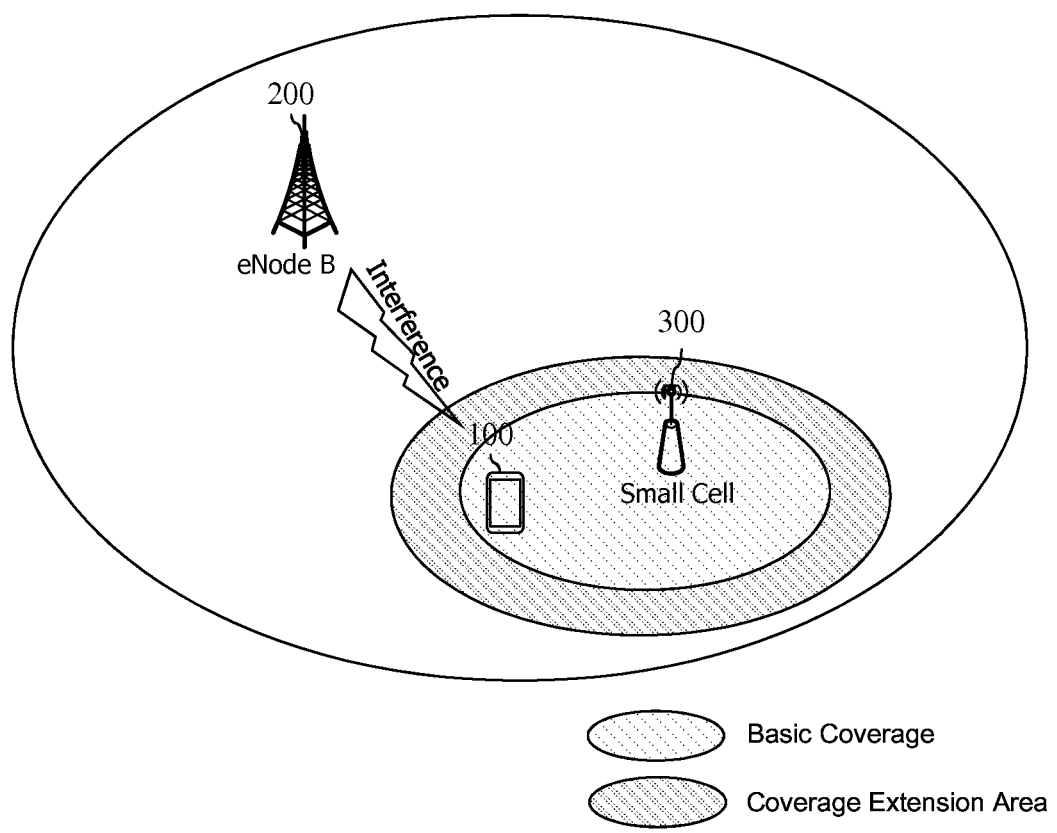
FIG. 16 illustrates a concept of expanding coverage of a small-scale cell according to a disclosure of the present specification.

FIG. 16 illustrates a concept of expanding coverage of a small-scale cell according to a disclosure of the present specification.

As shown in FIG. 16, the case that the UE 100 uses the CRS interference cancellation function has an effect of expanding the cell coverage or the cell radius of the base station 300 of the small-scale cell. In the drawing, a coverage extension area which is wider than the basic coverage of the small-scale cell 300 is denoted by hatching. Such a coverage extension area may be called a cell range expansion (CRE).

As such, by expanding the basic coverage of the small-scale cell 300 using the CRS interference cancellation function of the UE 100, an effect is obtainable that the traffic of the base station 200 of the macro cell is offloaded to the small-scale cell 300.

In other words, by using the CRS interference cancellation function of the UE, it can be implemented that the handover to the small-scale cell is performed even though a strength of a reference signal received from the small-scale cell is not greater than a threshold value over the strength of a reference signal received from the macro cell.

The embodiments described so far may be implemented through various means. For example, the embodiments of the present invention may be implemented by hardware, firmware, software or a combination thereof. Particularly, this will be described with reference to FIG. 17.

Figure 17:
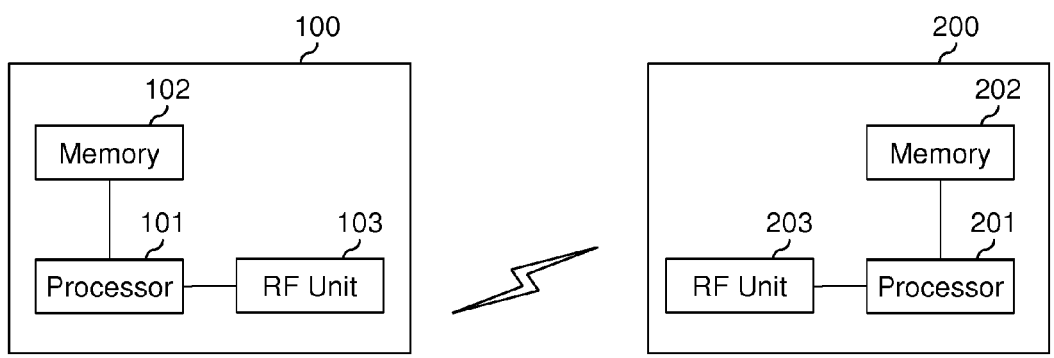
FIG. 17 is a block diagram illustrating a wireless communication system where an embodiment of the present invention is implemented.

FIG. 17 is a block diagram illustrating a wireless communication system where an embodiment of the present invention is implemented.

The base station includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

What is claimed is:

1. A method for performing measurements by a terminal in a wireless communication system in which a macro cell and a small-scale cell coexist, the method comprising:
receiving Cell-specific Reference Signal (CRS) assistance information from whichever cell, among the macro cell and the small-scale cell, is a serving cell, wherein the CRS assistance information includes information on a cell that transmits a CRS that causes interference;
receiving measurement configuration information from the serving cell;
receiving first CRS from the macro cell and second CRS from the small-scale cell, wherein a timing offset is adjusted between a subframe in which the first CRS is received from the macro cell and a subframe in which the second CRS is received from the small-scale cell; and
performing a measurement for whichever CRS, among the first CRS and the second CRS, is the CRS received from the serving cell by performing interference cancellation function, using the CRS assistance information, for whichever CRS, among the first CRS and the second CRS, is the CRS not received from the serving cell,
wherein the measurement configuration information includes information on a subframe in which a measurement of a neighbor cell is to be performed,
wherein the neighbor cell is a cell not corresponding to the serving cell.

2. The method of claim 1, wherein the CRS assistance information is received by being included in radio resource configuration information,
wherein the radio resource configuration information includes information on a subframe in which a measurement of the serving cell is to be performed.

3. The method of claim 1, wherein the CRS assistance information includes information on the CRS that causes interference and information on a cell that transmits the CRS that causes interference.

4. The method of claim 1, wherein the timing offset is equal to or less than 3 us and equal to or greater than zero.

5. The method of claim 1, wherein the timing offset is equal to or less than cyclic prefix length/2 and equal to or greater than zero.

6. A terminal for performing measurements in a wireless communication system in which a macro cell and a small-scale cell coexist, the terminal comprising:
- a receiver and,
- a processor that controls the receiver to:
- receive Cell-specific Reference Signal (CRS) assistance information from whichever cell, among the macro cell and the small-scale cell, is a serving cell,
- receive first CRS from the macro cell and second CRS from the small-scale cell, and
- receive measurement configuration information from the serving cell,
- wherein the CRS assistance information includes information on a cell that transmits a CRS that causes interference, wherein a timing offset is adjusted between a subframe in which the first CRS is received from the macro cell and a subframe in which the second CRS is received from the small-scale cell, and wherein the measurement configuration information includes information on a subframe in which a measurement of a neighbor cell is to be performed,
- wherein the neighbor cell is a cell not corresponding to the serving cell; and
- the processor further:
- performs a measurement for whichever CRS, among the first CRS and the second CRS, is the CRS received from the serving cell by performing interference cancellation function, using the CRS assistance information, for whichever CRS, among the first CRS and the second CRS, is the CRS not received from the serving cell.

7. The terminal of claim 6, wherein the CRS assistance information is received by being included in radio resource configuration information,
wherein the radio resource configuration information includes information on a subframe in which a measurement of the serving cell is to be performed.

8. The terminal of claim 6, wherein the CRS assistance information includes information on the CRS that causes interference and information on a cell that transmits the CRS that causes interference.

9. The terminal of claim 6, wherein the timing offset is equal to or less than 3 us and equal to or greater than zero.

10. The terminal of claim 6, wherein the timing offset is equal to or less than cyclic prefix length/2 and equal to or greater than zero.

* * * * *